United States Patent [19]

McCrady

[11] Patent Number: 5,580,252

[45] Date of Patent: Dec. 3, 1996

[54] GEOGRAPHICAL TRIVIA BOARDGAME FOR LEARNING ABOUT A STATE

[76] Inventor: Robert McCrady, 1072 Van Buren, Gary, Ind. 46402

[21] Appl. No.: 334,608

[22] Filed: Nov. 4, 1994

[51] Int. Cl.⁶ ................................................. G09B 19/22
[52] U.S. Cl. .......................... 434/128; 434/150; 434/130; 273/239
[58] Field of Search ................................. 434/128, 130, 434/150; 273/239, 236, 302, 292, 430, 279, 267

[56] References Cited

U.S. PATENT DOCUMENTS 387,220  8/1888  Forker ........................................ 273/236
3,711,966  1/1973  Drcsak ..................................... 273/236 X
4,118,036  10/1978  Marse ...................................... 273/239 X
4,674,752  6/1987  Brothers .................................. 273/239 X Primary Examiner—Gene Mancene
Assistant Examiner—Jeffrey A. Smith
Attorney, Agent, or Firm—Veo Peoples, Jr.; J. William Stader; Peoples & Hale

[57] ABSTRACT

The invention is a method and apparatus for a geographical trivia boardgame for learning about a state. The apparatus consists of a gameboard with a state map affixed thereon. The state map is divided into city regions. The players also are provided a score sheet and trivia cards. The players may place individual game pieces on the map after successfully locating the city name and answering a trivia question located on a trivia card. Points are also awarded and recorded on the score sheet.

6 Claims, 2 Drawing Sheets

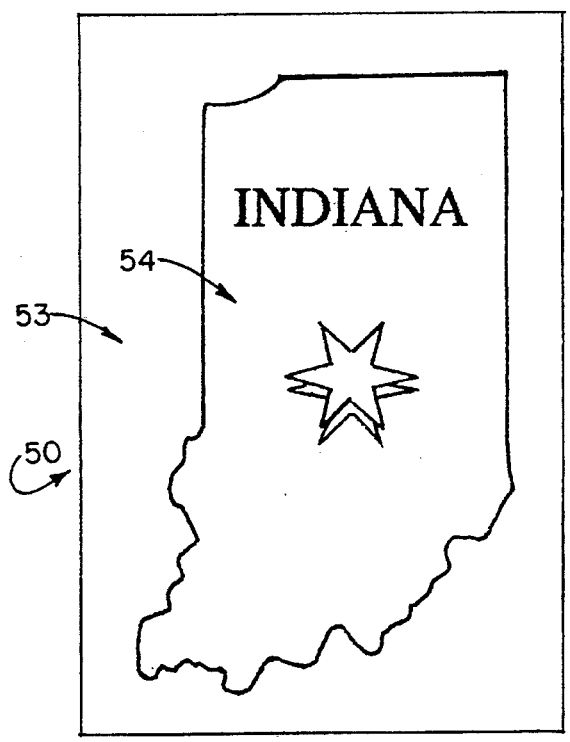
FIG. 2A
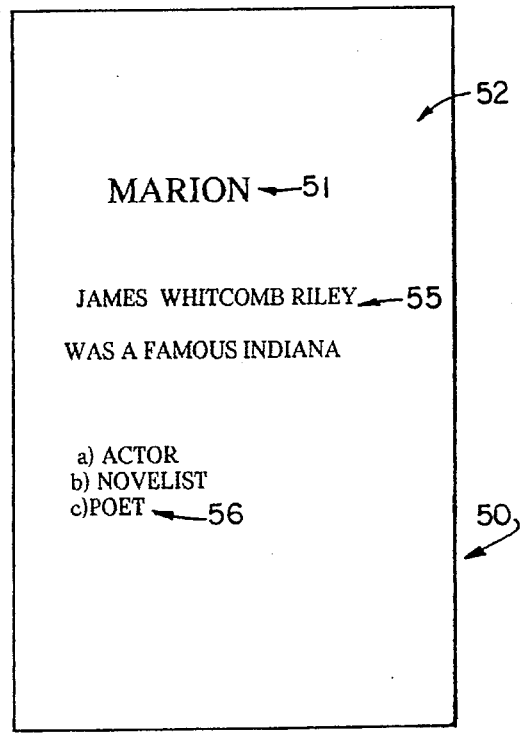
FIG. 2B
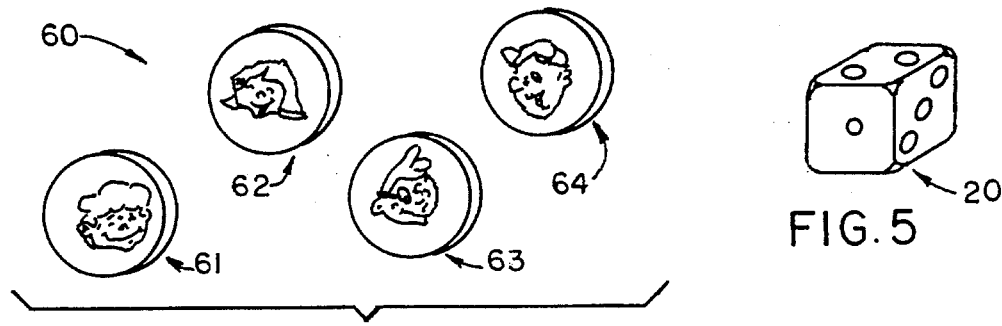
FIG. 3
FIG. 4
FIG. 5

GEOGRAPHICAL TRIVIA BOARDGAME FOR LEARNING ABOUT A STATE

BACKGROUND OF INVENTION

1. Field of Invention

This invention relates to the field of educational, geographical trivia boardgames and method of operating the said boardgame.

2. Description of Prior Art

Trivia question games are well established in American culture. Starting in the 1950's, there have been a variety of games which involve a player correctly answering a question of some type. More recently the television show JEOPARDY, began to create a renewed interest in a variety of trivia-type subjects. This phenomenon also surged with the creation of the boardgame TRIVIAL PURSUIT. Most of these early trivia games involved players proceeding through a gameboard in an organized fashion. While initially these games were of questionable educational use, attempts have been made and are ongoing to create a trivia game to stimulate the learning process. There continues to be a tremendous amount of research in developing a trivia game which cosines the excitement of trivia-type questions and possess an educational value. One area in which improvements are continuing is the use of a trivia-type game which encourages learning about the geography of the various states in the United States. As the following discussion of the prior art reveals, these games all suffer from a variety of drawbacks.

The first category requires that a player follow or be limited to a specific route. The second category of patents focus on a broad geographical region such the United States, a specific continent, or world. The final category requires some knowledge of the location of a specific entity (either state or city), but is usually a puzzle.

Turning to the first category, the first five U.S. Pat. Nos. 5,137,280 ('280), 4,674,752 ('752), 4,988,108 ('108), 5,150,907 ('907) and 5,135,231 ('231) focus primarily on moving on a determined or limited route. The answering of various trivia type questions allows a player to move and/or continue to play and ultimately win. Of particular notice is U.S. Pat. No. '752. In this game, players move through an individual state usually down an existing interstate or throughway. As a player enters various regions, they answer questions. Player movement is restricted by the route. U.S. Pat. No. '280 illustrates another variation of this format. In this game, players are given colored strings and attempt to arrange them onto a pattern on the game board. The game board disclosed is a map of the United States. Players answer questions and try to erect a route to a pre-determined spot (e.g New York to Seattle). The player's movement is limited by the length of colored string they possess and the destination chosen. Unfortunately, these games limit the need for a particular player to learn about the location of a feature within a state. A player would determine the location of a particular city or region by its location on a particular route.

The second group of patents focus on a broad geographical area. U.S. Pat. Nos. 5,085,439 ('439) and 4,552,357 ('357) are illustrative of this group. In U.S. Pat. No. '439, players answer a variety of questions about Africa. However, specific landmarks are not noted on the map. In fact, the illustration of the African continent is mainly aesthetic and is not necessary for the playing of the game. U.S. Pat. No. '357 is even more limited in scope. In this game players match major league sports teams with various cities.

The final group of patents focus on learning information on an individual U.S. state. U.S. Pat. No. 5,123,846 ('846) is a puzzle which is designed to help players learn the individual counties and county seats of a state. There are also questions to help players learn information on said state. U.S Pat. No. '649 is game where players must match an individual state with a state flag and state capital. It is possible for a player to deduce the location of a particular county or puzzle piece by its' shape instead the knowledge of its' actual location. Additionally, the multitude of play pieces (usually puzzle parts) increases the danger that a piece can be lost and limiting the enjoyment of the game.

OBJECTS OF THE INVENTION

It is object of the present invention to provide a boardgame which increases a players ability to learn the location of a various areas within a state without the use of a puzzle or route.

It is a further object of the present invention to provide a trivia game which imparts information concerning a state.

It is a further object of the present invention to provide a method of playing a boardgame which teaches players about a state with a minimum of parts.

It is a further object of the present invention to provide a learning device which reinforces the geographical location of various cities within a state without a player being aided by a specific route.

SUMMARY OF THE INVENTION

The present invention is a method and apparatus which overcomes the deficiencies in the prior art. The apparatus uses a minimum of game pieces and assists the player in learning the location of various regions of a state without relying on a predesignated route or limitation. The invention encourages the learning of the location of a specific city by encouraging the player to learn to city's actual spacial relationship within a state.

The present apparatus consists of a gameboard with a state map affixed. The map is divided into city regions. Each city region is named. Trivia cards containing the city region name and containing trivia-type questions and answers are also provided. Finally, there is a score sheet and sets of identical player pieces.

To play, each player attempts to place their player pieces onto the city regions on the gameboard state map and answer a trivia question. Points are awarded and recorded on the score sheets. A player's score depends on their success on correctly placing the game pieces and answering the trivia question.

BRIEF DESCRIPTION OF THE DRAWINGS

FIG. 2A is a view of the front of the trivia card which is part of the present invention.

FIG. 2B is a view of the reverse of the trivia card which is part of the present invention.

FIG. 3 is a view of the score sheets which is part of the present invention.

FIG. 4 is a view of the individual player pieces of the present invention.

FIG. 5 is a view of the die which is used in the present invention.

DETAILED DESCRIPTION OF THE INVENTION

Figure 1:
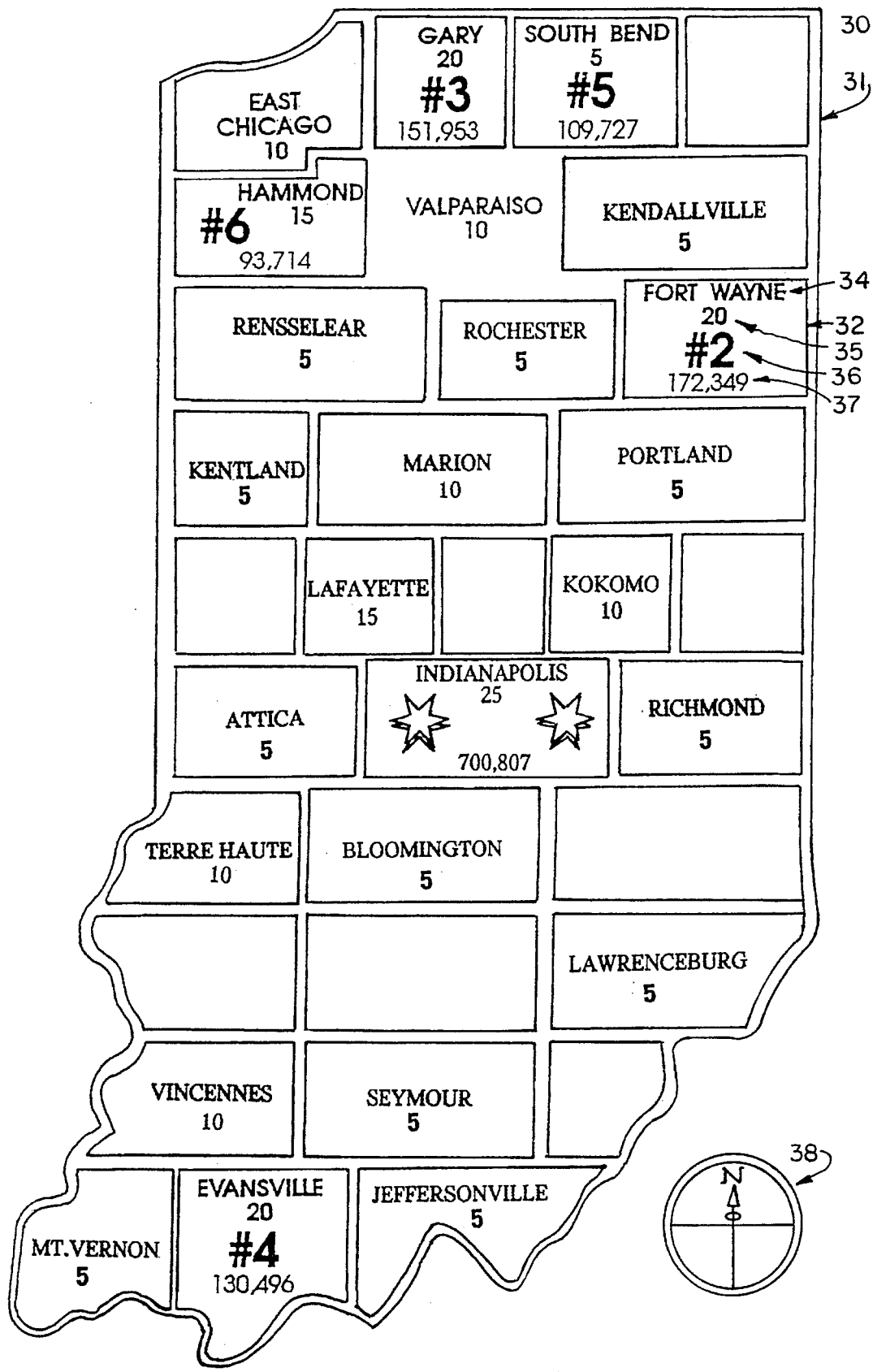
FIG. 1 is a view of the gameboard which is part of the present invention.

Referring to FIGS. 1, 2, 3, 4 and 5, it is possible to see the various major elements constituting the apparatus of the present invention. The invention is a boardgame with several additional elements that operate together in such a manner to educate the players regarding a variety of features relating to an individual state.

The major elements consist of a gameboard (FIG. 1–30), a score sheet (FIG. 3–40), a trivia card (FIGS. 2A and 2B–50) and a variety of player pieces (FIG. 4–60). Also a die (FIG. 5–20) is initially used to determine the first player to commence play.

The focus of the invention is the gameboard (FIG. 1–30). Imprinted on the gameboard is the map of a state (31). For illustrative purposes, Indiana has been chosen. However, any state within the United States may be chosen. Also imprinted on the gameboard is compass direction (38) and state name (39). The compass direction helps players understand the relative direction of the various features of a state. The state map (31) is further subdivided into 25 city regions. These city regions correspond to important population, social or cultural centers within a particular state. Each city region contains a city name (34) and a point value (35). On several of the larger cities, it may also be desirable to include the population (37) and the relative rank (36) of the city in comparison to other cities within the state.

The trivia card (FIG. 2–50) is the next element of the invention. The trivia card consists of a front (FIG. 2A–53) and a reverse (FIG. 2B–52). The front can contain a logo (54). The reverse (52) consists of three items—a city name (51), a question (55) and answers (56). The city name (51) on the trivia card corresponds to the city name (34) located on within the city region (32) of the state map (30). There will typically be twenty-five trivia cards in the invention.

The score sheet (FIG. 3–40) consists of a variety of rows, columns and headings. There are three headings—the city vote heading (41), the correct answer heading (42) and the first vote heading (43). There is also a total column (47) and a grand total location (48). Finally, there are rows for the city vote received (44), correct answer received (45) and the first vote received (46). Each row may consist of six blocks.

There are four sets of matching player pieces. Each set of matching player pieces consists of 6 identical individual player pieces. An example of a individual player piece is shown in FIG. 4–61. Examples of the other 3 sets of matching player pieces are shown in FIG. 4–62, 63 and 64.

The state map (30) and the individual player pieces (60) can be made of magnetically attractive materials. This would enable the player pieces to remain attached to the city regions on the state map. This feature can be useful is the invention is used while travelling in a car or displayed in a classroom.

The operation and method of the invention of the board-game consist of a variety of steps which involve the interaction of the above elements. Each player is provided with six identical individual player pieces. Next, a die (FIG. 5–20) is used to determine the order of play. Typically, each player rolls the die. The player with the highest number retrieves a trivia card (50); this commences a single turn of play. A single turn consists of the card holder reading the city name (51) from the trivia card to the player on their left. This player must then locate the city name (34) on the state map (31) within an allotted time interval. The player indicates the location of the city name (34) on the state map (31) by placing an individual player piece (61) onto the corresponding gameboard location. If the player is successful, the card holder will next read the question (55) located on the trivia card. The player will then match the correct answer (56), also located on the trivia card. If the player successfully completes the turn, they are awarded the point value (35) indicated on the state map and a predetermined correct answer points. The point value indicated are based on population, social or political considerations. The player records their points on the score sheet (40) under the appropriate headings. At the successful completion of a turn or the failure of a player to complete the turn, the game progresses to another player and the turn commences again. After a player places all of their individual player pieces (60), the game ends.

It will be obvious to those skilled in the art that various changes may be made without departing from the scope of the invention and the invention is not to be considered limited to what is illustrated in the drawings and described in the specification.

What is claimed is:

1. A geographical trivia board game for learning about a state comprising;
   (a) a state map subdivided into a plurality of city regions, each city region indicating a city name and a point value;
   (b) a plurality of sets of player pieces, each set containing a plurality of matching individual player pieces, one of said plurality of individual player pieces to be placed on one of the plurality of the city regions;
   (c) a plurality of trivia cards each with a front side and a reverse side, the reverse side containing one of the plurality of city names, a question and an answer to the question; and
   (d) a plurality of score sheets, each score sheet containing a city vote heading, a correct answer heading, a first vote heading, a total heading, grand total heading, a city vote row, a correct answer row, a first vote row, said point value recorded in the city vote row.

2. The geographical trivia board game for learning about a state according to claim 1, wherein one of the plurality of city regions contains a city rank and a city population.

3. The geographical trivia boardgame for learning about a state according to claim 2, wherein the gameboard and the matching individual player pieces are made of a material which magnetically attract to each other.

4. The geographical trivia boardgame for learning about a state according to claim 3, wherein the gameboard has a logo and a compass indicator affixed.

5. The geographical trivia boardgame for learning about a state according to claim 4, wherein there are twenty-five multicolored city regions, four player piece sets, six matching individual player pieces, twenty-five trivia cards and four score sheets.

6. The geographical trivia boardgame for learning about a state according to claim 5, wherein only four players can play.

* * * * *